US009752206B2

(12) United States Patent
Drouet et al.

(10) Patent No.: US 9,752,206 B2
(45) Date of Patent: Sep. 5, 2017

(54) PLASMA HEATED FURNACE FOR IRON ORE PELLET INDURATION

(71) Applicant: PYROGENESIS CANADA INC., Montreal, Quebec (CA)

(72) Inventors: Michel G. Drouet, Montreal (CA); Pierre Carabin, Montreal (CA)

(73) Assignee: PYROGENESIS CANADA INC., Montreal (CA)

( * ) Notice: Subject to any disclaimer, the term of this patent is extended or adjusted under 35 U.S.C. 154(b) by 198 days.

(21) Appl. No.: 14/362,057

(22) PCT Filed: Dec. 3, 2012

(86) PCT No.: PCT/CA2012/001107
§ 371 (c)(1),
(2) Date: May 30, 2014

(87) PCT Pub. No.: WO2013/078549
PCT Pub. Date: Jun. 6, 2013

(65) Prior Publication Data
US 2014/0311286 A1 Oct. 23, 2014

Related U.S. Application Data

(60) Provisional application No. 61/566,403, filed on Dec. 2, 2011.

(51) Int. Cl.
*C22B 1/20* (2006.01)
*C22B 1/24* (2006.01)
(Continued)

(52) U.S. Cl.
CPC .............. *C22B 1/2406* (2013.01); *C22B 1/20* (2013.01); *C22B 1/2413* (2013.01); *F27B 21/06* (2013.01);
(Continued)

(58) Field of Classification Search
CPC ... F27B 21/06; C22B 1/20; C22B 1/24; C22B 1/16
See application file for complete search history.

(56) References Cited

U.S. PATENT DOCUMENTS 3,788,703 A * 1/1974 Thorpe ................... E21C 37/18
175/16
3,947,001 A 3/1976 Leighton
(Continued)

FOREIGN PATENT DOCUMENTS

| CA | 2043504 | 1/1995 | |
| EP | 0399375 A1 * | 11/1990 | ............ B22F 1/0048 |

(Continued)

OTHER PUBLICATIONS

International Search Report mailed on Mar. 11, 2013 in PCT application No. PCT/CA2012/001107. (6 pages).

*Primary Examiner* — George Wyszomierski
*Assistant Examiner* — Tima M McGuthry Banks
(74) *Attorney, Agent, or Firm* — Shutts & Bowen, LLP

(57) ABSTRACT

In the present pelletizing apparatus, the induration of iron ore concentrate pellets is achieved in a tunnel furnace heated by plasma torches, wherein the generation of CO2 by the conventional iron ore pelletizing processes is reduced by using electricity powered plasma torches instead of burning natural gas, heavy oil or pulverized coal in burners, thereby reducing considerably industrial pollution of the atmosphere.

5 Claims, 5 Drawing Sheets

(51) Int. Cl.
*F27B 21/06* (2006.01)
*H05H 1/34* (2006.01)
*H05H 1/44* (2006.01)

(52) U.S. Cl.
CPC ............... *H05H 1/34* (2013.01); *H05H 1/44* (2013.01); *H05H 2001/3452* (2013.01)

(56) References Cited

U.S. PATENT DOCUMENTS

| | | |
|---|---|---|
| 4,168,951 A | 9/1979 | Drugge |
| 4,332,551 A | 6/1982 | Haslmayr et al. |
| 4,577,838 A | 3/1986 | Mathiesen |
| 5,685,893 A | 11/1997 | Field et al. |
| 5,747,767 A | 5/1998 | Severance et al. |
| 2010/0024595 A1* | 2/2010 | Kim, II ................. C21B 13/002 75/10.19 |
| 2011/0068521 A1 | 3/2011 | Rundel |

FOREIGN PATENT DOCUMENTS

| | | |
|---|---|---|
| EP | 0790756 | 8/1997 |
| GB | 1102900 | 2/1968 |

\* cited by examiner

PLASMA HEATED FURNACE FOR IRON ORE PELLET INDURATION

CROSS REFERENCE TO RELATED APPLICATIONS

This Application is a national stage entry of and claims priority to International Application No. PCT/CA2012/001107, filed Dec. 3, 2012, entitled Plasma Heated Furnace For Iron Ore Pellet Induration. International Application No. PCT/CA2012/001107 was published as WO 2013/078549 on Jun. 6, 2013. International Application No. PCT/CA2012/001107 claims priority to U.S. Provisional Application No. 61/566,403, which was filed on Dec. 2, 2011. International Application No. PCT/CA2012/001107 is incorporated by reference in its entirety. U.S. Provisional Application No. 61/566,403 is incorporated by reference in its entirety.

FIELD OF THE INVENTION

The present invention relates to the induration of iron ore concentrate pellets.

BACKGROUND OF THE INVENTION

In the face of shrinking world reserves of high-grade iron ore, low-grade ores are used, which must be concentrated before further processing. The concentrated iron ore fines obtained cannot be used as such, for example in a blast furnace to produce pig iron or to produce sponge iron in a direct reduction iron plant (DRI).

The fines have first to be mixed with additives such as bentonite or other binders such as described for example in U.S. Pat. No. 5,685,893 issued to Field et al., and then shaped into small lumps, the pellets, which are then hardened by firing in a furnace at temperature up to 1350° C.

The total world production of such iron pellets is about 400 million metric tonnes per year, which corresponds to about 20% of the total iron ore production.

The most commonly employed method of heat-hardening, such as described for example in U.S. Pat. No. 3,947,001 issued to Leighton, is of disposing the iron ore pellets on a travelling grate to carry the pellets through a tunnel-like enclosure where they are progressively subjected to drying, preheating, firing, after-firing and cooling. An alternative technology, as described for example in U.S. Pat. No. 4,168,951 issued to Drugge, or as proposed by Metso, is to use a rotary kiln for the firing zone of the process instead of a moving grate.

The initial step of drying is carried out at moderate temperature to allow a gradual release of the moisture in the pellets. After drying, the pellets are fired at the required temperature to cause the pellets to fuse.

The process heat is provided by fuel burners, such as proposed by companies such as Metal7, located on the side of the tunnel-like furnace enclosure. However, it has been reported, for example in aforementioned U.S. Pat. No. 3,947,001, that direct exposure of the radiant heat from the burning fuel flame has to be avoided as it could cause overheating of the top layer of pellets. To overcome this possibility, it was proposed to install each burner in a small port extension located on the furnace tunnel, as illustrated in FIG. 1 of U.S. Pat. No. 3,947,001, thus shielding the pellets from the radiant heat from the burners.

As again illustrated in FIG. 1 of U.S. Pat. No. 3,947,001, Leighton proposed two different burner installations: on the right of this figure, the burner is installed in a vertical shaft, while on the left of the figure, the burner is horizontal. In both cases the pellets are shielded from the burner flame radiant heat.

In the case of the processing of pellets fired in a kiln, such as, for example in a Metso plant, it is not possible to prevent exposure of the pellets to the radiant heat from the flame of the kiln single burner installed on the kiln axis, although tumbling of the pellets in the rotating kiln may minimize overheating.

The combustion, in the burners, of natural gas, heavy oil and/or pulverized coal results, unfortunately, in the production of very important amounts of $CO_2$. For example, a typical pellet plant producing annually 10 million metric tonnes of pellets emits about one million metric tonnes of $CO_2$; therefore, the total world pellet production of 400 million metric tonnes of pellets corresponds to the production of about 40 million metric tonnes of $CO_2$ per year.

Once the very hot combustion gases have gone through the bed of pellets being fired, they are used to preheat and dry the green oncoming pellets before being released to the atmosphere. The released gas temperature being about 350° C., the process energy efficiency would be of only about 80%.

Furthermore, the combustion gases, which are used to dry the ore pellets, are, in addition to $CO_2$, composed of water vapor, which is not an optimal composition as a drying gas.

Because of the important release of green-house gases, of the low energy efficiency of the heating process and of the fact that a wet gas (that is a combustion gas containing water vapor in addition to carbon dioxide and nitrogen) is used in the drying zone of the furnace, there is a need for an improved technology for the induration of iron ore concentrate pellets.

SUMMARY OF THE INVENTION

It is therefore an aim of the present invention to provide a novel process and apparatus to reduce the generation of $CO_2$ by iron ore pelletizing processes.

Therefore, in accordance with the present invention, there is provided a pelletizing apparatus comprising a firing chamber, a travelling grate for sequentially transporting ore pellets in drying, firing and cooling zones and at least one plasma torch for providing the air, heated at very high temperature, required for indurating the dried pellets in the firing chamber and drying the green pellets fed into the furnace.

More specifically, recuperated air from the pellet cooling zone of the apparatus is introduced in a chamber, where it is mixed with the extremely hot air from the plasma torch, prior to entering the pellet firing chamber.

As the process air is heated, not by fuel combustion, but by the torch electric arc, the hot air is very dry as it enters the pellet drying zone providing significant drying efficiency.

Also in accordance with the present invention, there is provided a pelletizing apparatus, comprising a firing chamber, a traveling grate for sequentially transporting ore pellets in drying, firing and cooling zones, and at least one plasma torch for providing a heat required for indurating the ore pellets in the firing chamber.

Further in accordance with the present invention, there is provided a pelletizing method, wherein ore pellets are fed sequentially through drying, firing and cooling zones, and wherein heat required for the process is provided by at least one plasma torch.

Still further in accordance with the present invention, there is provided a firing device in a pelletizing apparatus, comprising a firing chamber for ore pellets being transported through the pelletizing apparatus, and at least one plasma torch for providing a heat required for indurating the ore pellets in the firing chamber.

Still further in accordance with the present invention, there is provided a plasma torch for use in a firing device of an iron ore pelletizing apparatus, comprising at least two electrodes, namely one cathode and one anode, an electric arc being sustained between the two electrodes, a vortex ring for injecting compressed gas, such as air, between the two electrodes and for spinning the gas at high speed, an electrical insulator placed between the two electrodes, a jet of hot plasma gas exiting the torch for use in heating air before it reaches a firing chamber of the firing device.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

Reference will now be made to the accompanying drawings, showing by way of illustration an illustrative embodiment of the present invention, and in which.

DESCRIPTION OF ILLUSTRATIVE EMBODIMENTS

The present pelletizing apparatus uses a plasma heated furnace to reduce, or even eliminate, the generation of $CO_2$ in an iron ore pelletizing process, to increase the energy transfer efficiency of the pellet heating process, and to provide a dry gas (air) in the green pellets drying section. Plasma torches are used to heat the induration furnace in place of the conventional natural gas, heavy oil or/and pulverized coal burners and, in doing so, to contribute to reducing considerable pollution of the atmosphere and saving energy.

Figure 2:
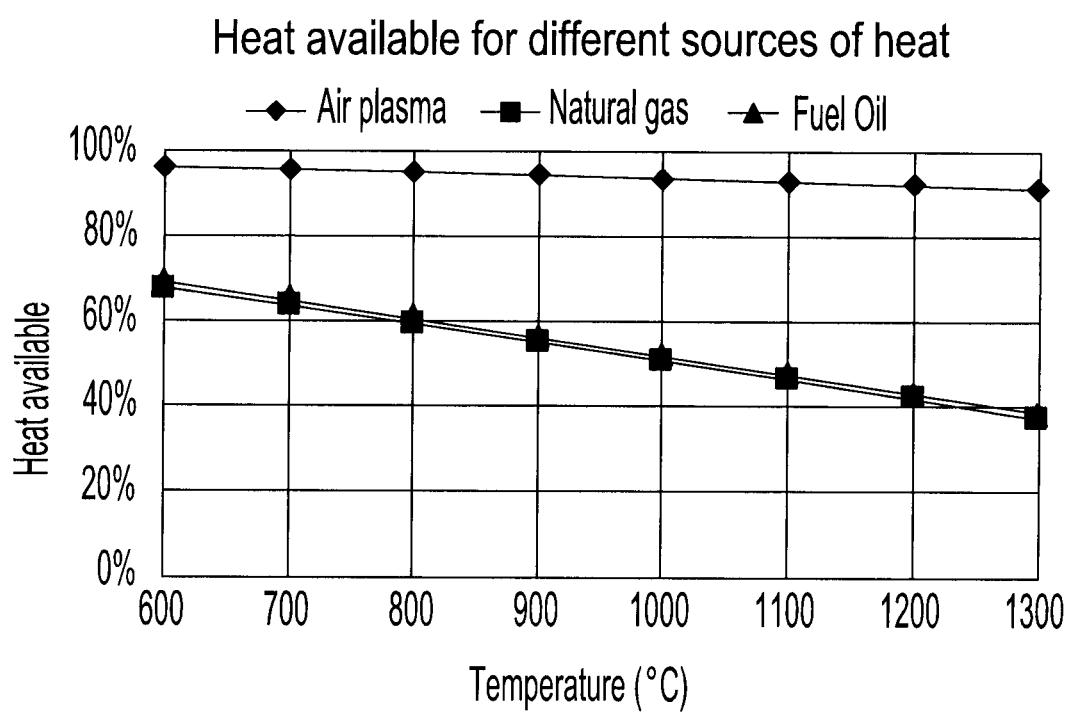
FIG. 2 is a graphic representation of the dependence of the energy transfer efficiency on the off-gas temperature for a fuel or gas burner and a plasma torch.

For a conventional burner section of the firing zone equipped, for example a 3.75 MW Metal7 burner, the required combustion air consumption would be about 3500 $Nm^3/h$. By contrast, given both the facts that no combustion air is required and the higher heat transfer efficiency of the substitute plasma torch, as illustrated in FIG. 2, the air flow required would be only about 430 $Nm^3/h$ with the present plasma heated furnace.

In the induration tunnel, the green pellets are charged onto a grate; with the grate moving, the pellets sequentially pass through drying, preheat, firing and cooling zones.

Figure 1:
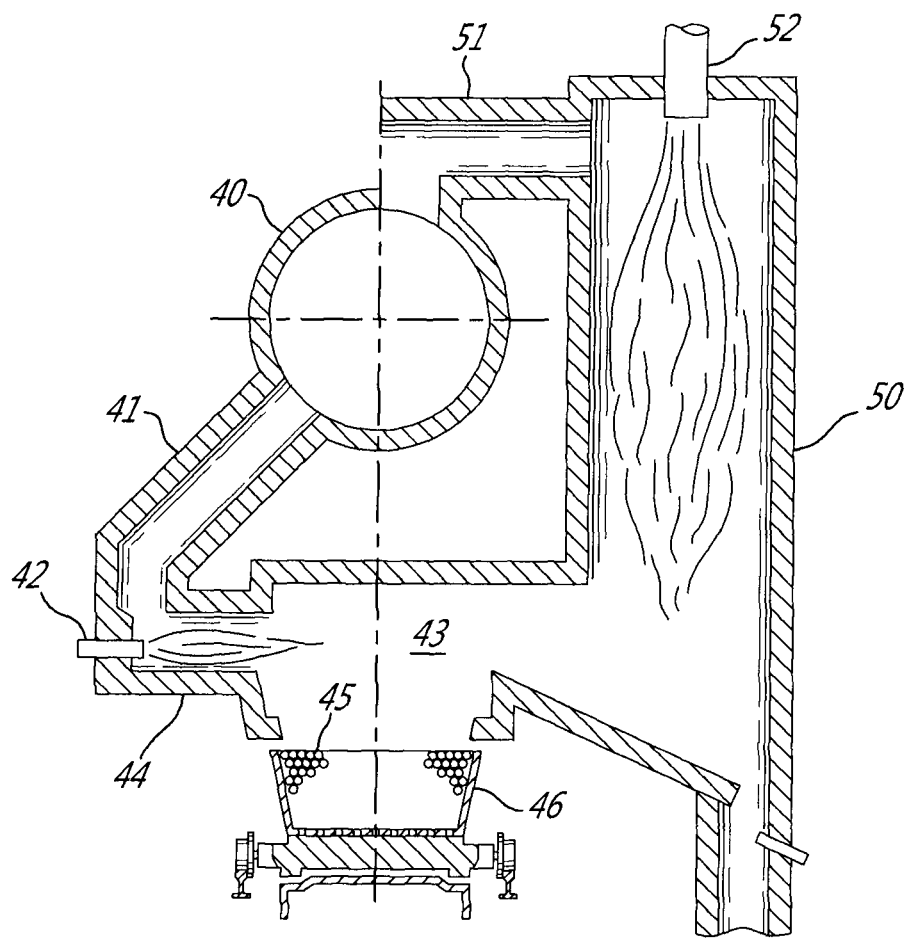
FIG. 1 is a schematic transverse vertical cross-sectional view of a conventional firing chamber construction.

With reference to FIG. 1, a transverse vertical cross-section of a conventional firing zone is therein shown with two possible and different burner arrangements: on the left of FIG. 1, a burner 42 is horizontal while on the right of FIG. 1, a burner 52 is in a vertical position. Depending on the arrangement considered, hot recuperated air is conveyed from the pellet cooling zone of the tunnel furnace, via conduit 40 and downcomer pipe 41, or conduit 51, to be heated by the flame from the fuel burner 42, or burner 52, and the heated air being directed horizontally into a firing chamber 43 via a laterally extending tunnel 44, or a shaft 50.

Green pellets 45 distributed on pallets 46 and previously dried and preheated, are then heat-hardened in the firing chamber 43.

In a typical pelletizing plant such as that shown in FIG. 1, a plurality of downcomers 41 or conduits 51, burners 42 or 52 and laterally extending tunnels 44 or shaft 50, are employed at spaced intervals along the firing chamber 43.

Figure 3:
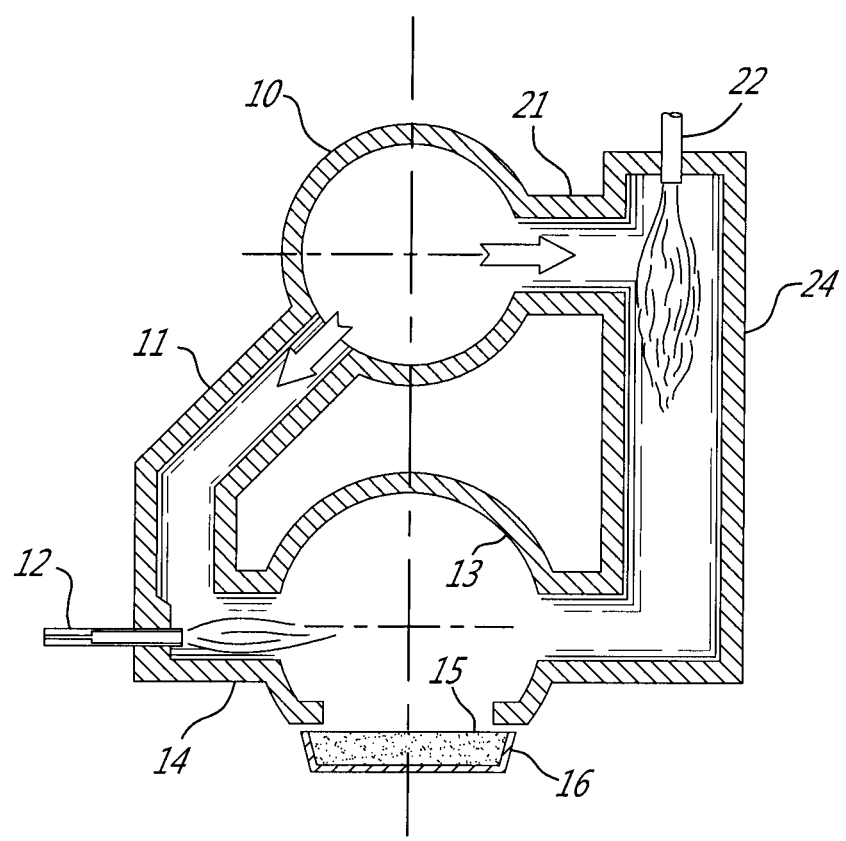
FIG. 3 is a schematic transverse vertical cross-sectional view of a firing chamber of an induration tunnel furnace showing the location of the plasma torch, in accordance with the present invention.

Now referring to FIG. 3, a transverse vertical cross-section of the firing zone of the present pelletizing apparatus is shown with two possible locations for the installation of a plasma torch: on the left of FIG. 3, a plasma torch 12 is horizontal while on the right, a plasma torch 22 is mounted vertically. Depending on the arrangement considered, hot recuperated air is conveyed from the pellet cooling zone of the tunnel furnace, via conduit 10 and downcomer 11, or conduit 21, to be mixed with extremely hot air heated by plasma torch 12, or 22. The hot air mixture is then directed towards a firing chamber 13 via a conduit 14, or a shaft 24.

Green pellets 15, uniformly distributed onto a grate 16 and previously dried and preheated, are then heat-hardened in the firing chamber 13.

In a plasma fired iron ore induration furnace, from conduit 10 providing hot recuperated air from the pellet cooling zone, there would be a plurality of downcomers 11, or conduits 21, leading to the laterally extending tunnels 14, or shafts 24, where the hot recuperated air would be mixed with the extremely hot air heated by the plasma torches 12, or 22, before entering the firing chamber 13. Such a plurality of downcomers 11, conduits 21, plasma torches 12 and 22, laterally extending tunnels 14 and shafts 24 would, as required by the process, be employed at spaced intervals along the length of the firing chamber 13.

It is important to notice that, in both proposed arrangements for the installation of the torches 12 and 22, the pellets are shielded from exposure to the plasma flame intense radiant heat, thus preventing local pellet overheating.

The plasma torches 12 and 22 each use electricity to heat air to very high temperatures (5000-10000 Kelvin). No fossil fuels are used to generate the heat. Other gases can be heated by the plasma torch such as nitrogen or argon.

Figure 4:
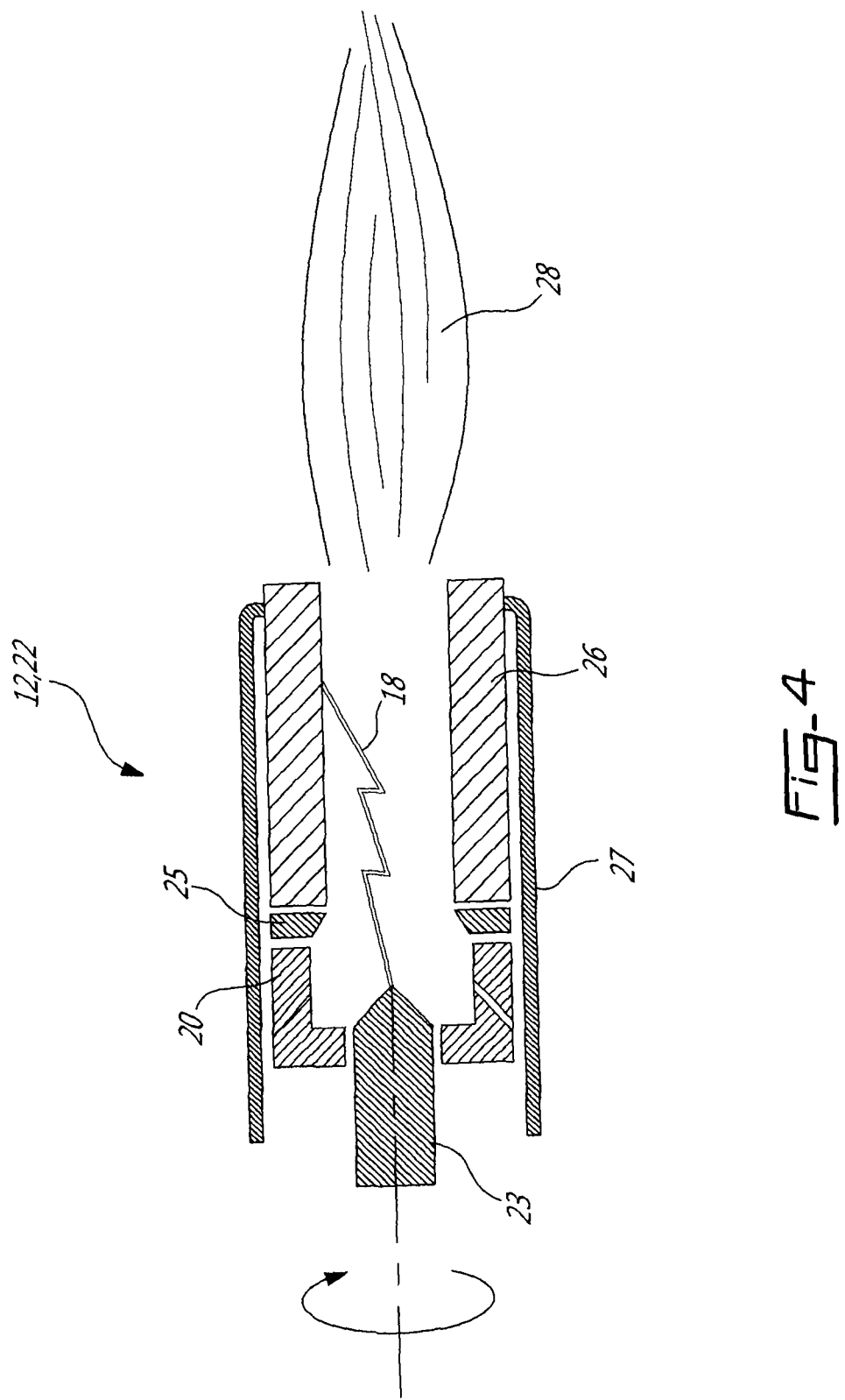
FIG. 4 is a schematic vertical cross-sectional view of the plasma torch.

As seen in FIG. 4, the plasma torches 12 and 22 can each comprise at least two electrodes: one cathode 23 and one anode 26. An electric arc 18 is sustained between the two electrodes 23 and 26. Compressed air (or another gas) is injected between the two electrodes through a vortex ring 20 that spins the air at high speed, limiting point erosion on the anode. An electrical insulator 25 made of ceramic or other electrically insulating material is placed between the two electrodes. In order to attain high power, multiple anodes and vortexes are used to increase arc length and volume of hot gas. The internal parts of the torch are mounted inside a water cooled shell 27 that keeps the electrodes cool relative to the hot process environment. A jet of hot plasma gas 28 exits the torch and is used to heat the air in the downcomer pipe 11.

Figure 5:
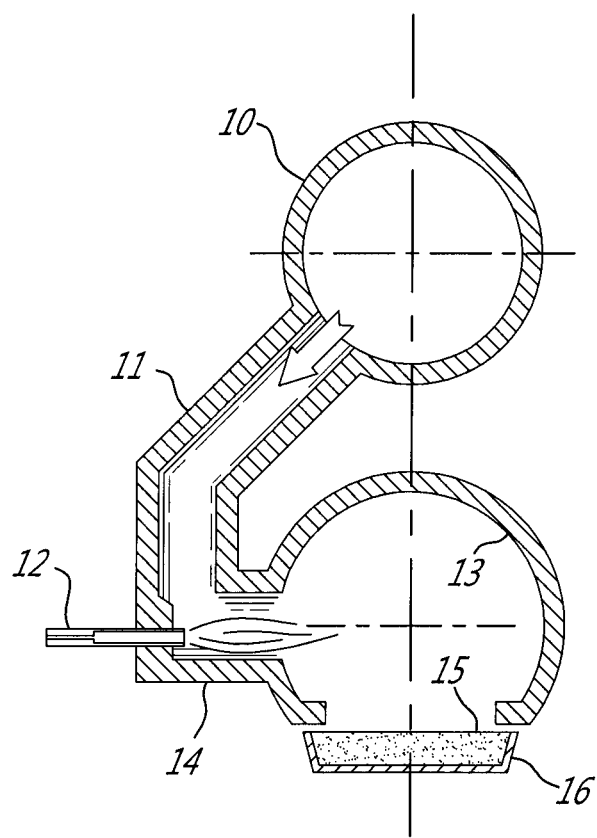
FIG. 5 is a schematic transverse vertical cross-sectional view of a firing chamber of an induration tunnel furnace, in accordance with another embodiment of the present invention.

FIG. 5 shows another embodiment, similar to that of FIG. 3, but wherein there is only the plasma torch 12. Hot recuperated air is conveyed from the pellet cooling zone of the tunnel, via the conduit 10 and the downcomer pipe 11, such that it can be heated to a higher temperature by the mixing thereof with the extremely hot air heated by the plasma torch 12. The heated air is directed horizontally into the firing chamber 13 via the laterally extending tunnel 14. The pellets 15, distributed onto the grate 16 and previously dried and preheated, are then heat-hardened in the firing chamber 13.

Although the invention has herein been described in detail with reference to a preferred embodiment, many variations may be made by those skilled in the art without departing from the spirit and scope thereof. For example, the placement of the plasma torch may vary. In addition, although the invention has been illustrated with reference to a straight-line type of pelletizing apparatuses, it is equally applicable to a pelletizing apparatus having a circular configuration.

Finally, although the present invention has been described hereinabove by way of embodiments thereof, it may be modified, without departing from the nature and teachings of the subject invention as described herein.

The invention claimed is:

1. A pelletizing apparatus, comprising a firing chamber, a traveling grate for sequentially transporting ore pellets in drying, firing and cooling zones, and at least one plasma torch for providing a heat required for indurating the ore pellets in the firing chamber, wherein means are provided for conveying air heated by the plasma torch to the drying zone for drying green pellets located upstream of the firing zone.

2. The pelletizing apparatus according to claim 1, wherein there are provided two plasma torches.

3. The pelletizing apparatus according to claim 1, wherein means are provided for introducing air recuperated from the pellet cooling zone in at least one chamber, where it is mixed with the extremely hot air from the plasma torch, prior to entering the pellet firing chamber.

4. A pelletizing apparatus, comprising a firing chamber, a traveling grate for sequentially transporting ore pellets in drying, firing and cooling zones, and at least one plasma torch for providing a heat required for indurating the ore pellets in the firing chamber, wherein means are provided for introducing air recuperated from the pellet cooling zone in at least one chamber, where it is mixed with the extremely hot air from the plasma torch, prior to entering the pellet firing chamber.

5. The pelletizing apparatus according to claim 4, wherein there are provided two plasma torches.

* * * * *